United States Patent
Lerer et al.

(10) Patent No.: US 10,460,206 B2
(45) Date of Patent: Oct. 29, 2019

(54) DIFFERENTIATING PHYSICAL AND NON-PHYSICAL EVENTS

(71) Applicant: Facebook, Inc., Menlo Park, CA (US)

(72) Inventors: Adam Kal Lerer, New York, NY (US); Robert D. Fergus, New York, NY (US); Ronan Alexandre Riochet, New York, NY (US)

(73) Assignee: Facebook, Inc., Menlo Park, CA (US)

(*) Notice: Subject to any disclaimer, the term of this patent is extended or adjusted under 35 U.S.C. 154(b) by 46 days.

(21) Appl. No.: 15/820,968

(22) Filed: Nov. 22, 2017

(65) Prior Publication Data

US 2019/0156149 A1     May 23, 2019

(51) Int. Cl.
*G06K 9/62*     (2006.01)
*G06N 20/00*   (2019.01)
*G06K 9/00*     (2006.01)
*G06K 9/46*     (2006.01)
*G06N 3/04*     (2006.01)

(52) U.S. Cl.
CPC ....... *G06K 9/6234* (2013.01); *G06K 9/00718* (2013.01); *G06K 9/4628* (2013.01); *G06K 9/6202* (2013.01); *G06K 9/6256* (2013.01); *G06K 9/6271* (2013.01); *G06N 20/00* (2019.01); *G06N 3/0454* (2013.01)

(58) Field of Classification Search
None
See application file for complete search history.

(56) References Cited

U.S. PATENT DOCUMENTS

| | | | |
|---|---|---|---|
| 2018/0189609 A1* | 7/2018 | Park | G06K 9/6256 |
| 2018/0247183 A1* | 8/2018 | Kanebako | G06N 3/0454 |
| 2018/0247201 A1* | 8/2018 | Liu | G06T 1/00 |
| 2018/0322366 A1* | 11/2018 | Lim | G06K 9/6256 |
| 2019/0073567 A1* | 3/2019 | Itou | G06K 9/6262 |

OTHER PUBLICATIONS

Lerer, A. et al., "Learning Physical Institution of Block Towers by Example," Mar. 3, 2016, 11 pages.

* cited by examiner

*Primary Examiner* — Leon Viet Q Nguyen
(74) *Attorney, Agent, or Firm* — Fenwick & West LLP

(57) ABSTRACT

To differentiate physical and non-physical events, a discrimination system based on unsupervised machining learning is used to predict a plausibility of objects' behaviors between a starting and ending time point. The discrimination system receives a set of initial, or "starting" content frames, each depicting a state of objects at a starting time point and an arrangement or "behavior" of those objects at the starting time. To train the discrimination system, the first model uses the starting content frame to generate a subsequent content frame, while the second model generates a subsequent content frame without using the starting content frame. A discriminator model may thus be trained without supervision by treating the subsequent content frame generated from the first model as a possible behavior of the starting content frame, and the subsequent content frame generated from the second model as an impossible behavior of the starting content frame.

20 Claims, 5 Drawing Sheets

400

405

Receive Set Of Starting Content Frames, Each Depicting State Of Plurality Of Objects At Starting Time Point
410

Apply First Model To Generate Set Of Plausible Ending Content Frames For Each Starting Content Frame, First Model Trained To Generate Subsequent Content Frame Based On Starting Content Frame
420

Apply Second Model To Generate Set Of Implausible Ending Content Frames For Each Starting Content Frame, Second Model Trained To Generate A Subsequent Content Frame Without Using A Starting Content Frame
430

Train Discriminator Model Using Set Of Starting Content Frames, Set Of Plausible Ending Content Frames, And Set Of Implausible Ending Content
440

FIG. 4

DIFFERENTIATING PHYSICAL AND NON-PHYSICAL EVENTS

BACKGROUND

This disclosure relates generally to differentiating physical and non-physical events, and more specifically to differentiating physical and non-physical events based on predicting a plausibility of objects' behaviors between a starting and ending time point.

Interaction with the world requires a common-sense understanding of how it operates at a physical level. For example, human being can quickly assess how to walk over a surface without falling, or can assess how an object will behave if pushing it. Human being makes such judgements relying on intuition, instead of invoking Newton's laws of mechanics. To mimic such judgments by a computing device, a prediction model is developed to predict what is going to happen next to one or more objects in a scene. A typical such prediction model is a supervised-learning prediction model that is trained by labeled data including a set of known inputs and a set of corresponding known outputs. Complexity of interactions of objects with the scene may result in large amounts of inputs and outputs. The large amounts of inputs and outputs prevent the prediction model from developing a large structure, and from predicting large amounts of events. The complexity may also vary the inputs such that the varied inputs cause inaccurate predicted outputs.

SUMMARY

To differentiate physical and non-physical events, a discrimination system based on unsupervised machining learning is used to predict a plausibility of objects' behaviors between a starting and ending time point.

During a training phase, the discrimination system receives a set of initial, or "starting" content frames, each depicting a state of a plurality of objects at a starting time point and an arrangement or "behavior" of those objects at the starting time. Examples of a starting content frame include an image, a photo, a video, or a series of images. To train the discrimination system, two models are used to generate subsequent content frames from the starting content frame. The first model uses the starting content frame as an initial content frame to generate a subsequent content frame, while the second model generates a subsequent content frame without using the starting content frame, and may generate "noisy" data unrelated to the starting position. A discriminator model of the discrimination system may thus be trained without supervision by treating the subsequent content frame generated from the first model as a possible behavior of the starting content frame (also referred to as plausible ending content frame), and the subsequent content frame generated from the second model as an impossible behavior of the starting content (also referred to as implausible ending content frame). The first model includes a conditioned generative adversarial network (GAN) model that uses the starting content frame to generate a set of plausible ending content frames. The second model includes an unconditioned GAN model that generates a set of implausible ending content frames without using the starting content frame. The discrimination system trains the discriminator model, using the set of starting content frames, the set of plausible ending content frames and the set of plurality of implausible ending content frames, to predict a preferred ending frame conforming to plausible physical events from a first and second ending frame given a starting content frame. The set of plausible ending content frames are a positive training set for plausible ending frames, and the set of implausible ending frames are a negative training set for the set of plausible ending content frames.

During a testing phase, in addition to receiving a starting content frame, the discrimination system receives an ending content frame indicating a state of a plurality of objects at the ending time point. The discrimination system uses the trained discriminator model to predict how likely the ending content frame is (e.g., a state of the ending content frame is plausible or implausible). The discrimination system generates a value the predicting. For example, if the trained discriminator model predicts that the ending content frame is more likely to be plausible, the generated value (e.g., "1") indicates the state of the ending content frame is plausible. If the trained discriminator model predicts that the ending content frame is more likely to be implausible, the generated value (e.g., "0") indicates the state of the ending content is implausible.

In this way, the discrimination system may learn how to distinguish plausible or "possible" future states of content frames based on the current state of the content frames.

BRIEF DESCRIPTION OF THE DRAWINGS

FIG. 4 is a flowchart illustrating a process for training a discriminator model, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Example of Discriminating Objects' Behaviors Between Starting and Ending Point

Physical event describes a behavior of one or more objects that follows physical phenomena. Non-physical event describes a behavior of one or more objects that does not follow physical phenomena. That is, the change in objects over time shown in content, such as a video, may follow possible physical events, or may follow non-physical events and not be plausibly explained by physical events. For example, a tower of wooden blocks at a staring time point tends to collapse to an ending position of the blocks at an end time point. Physical event describes that the tower of wooden blocks falling over at the ending time point follow physical phenomena, e.g., the tower of wooden blocks falls over at right locations, and having an orientation of blocks after falling that are consistent with the orientation of the blocks on the tower. Non-physical event describes the tower of wooden blocks falling over at the second time point does not follow physical phenomena, e.g., the tower of wooden blocks falls over at wrong locations or with an orientation inconsistent with the orientation of the blocks in the tower. To differentiate physical and non-physical events, a discrimination system is used to predict a plausibility of objects' behaviors between a starting and ending time point. Examples are described below.

Figure 1A:
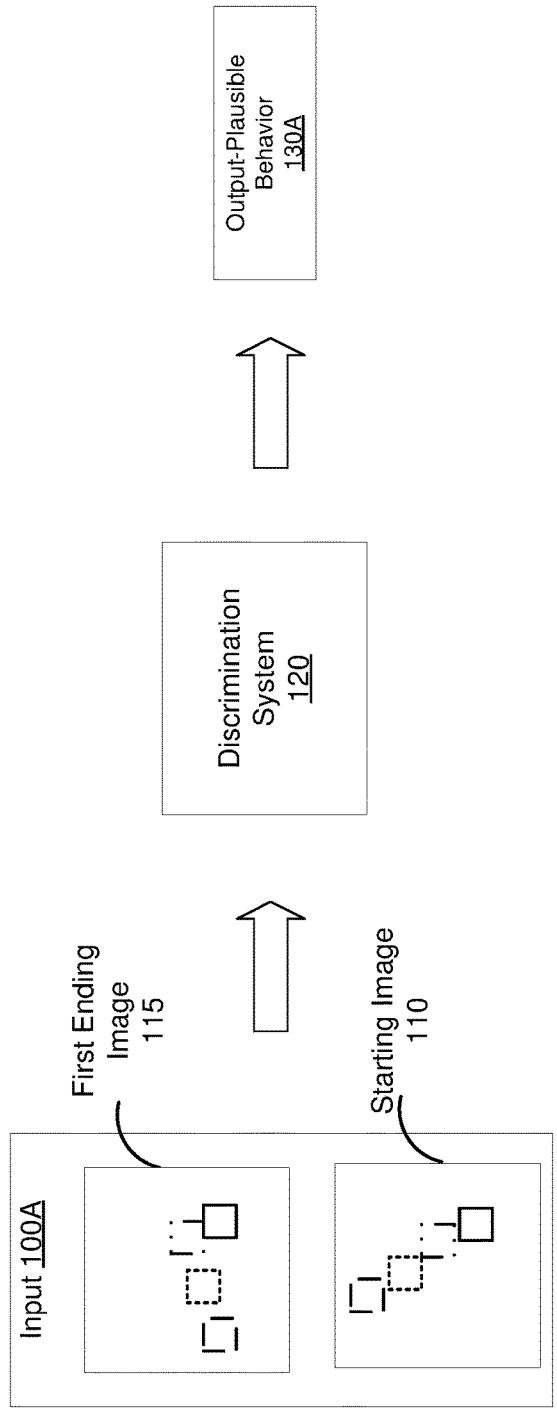
FIG. 1A is an example of discriminating objects' behaviors between a starting image and an ending image, via a discrimination system, in accordance with an embodiment.

FIG. 1A is an example of discriminating objects' behaviors between a starting image 110 and a first ending image 115, via a discrimination system 120, in accordance with an embodiment. In the embodiment of FIG. 1A, an input 100A includes the starting image 110 and the first ending image 115. The starting image 110 shows that four blocks marked by different line styles are stacked in a first manner at a starting time point, and the first ending image 115 shows that the four blocks fall over in a second manner at an ending time point. The discrimination system 120 receives the input 100A, and predicts whether the four stacked blocks falling over in the second manner is plausible in comparison to the first manner at the starting point. The discrimination system 120 generates an output 130A indicating that the four stacked blocks falling over in the second manner at the ending time point is plausible.

Figure 1B:
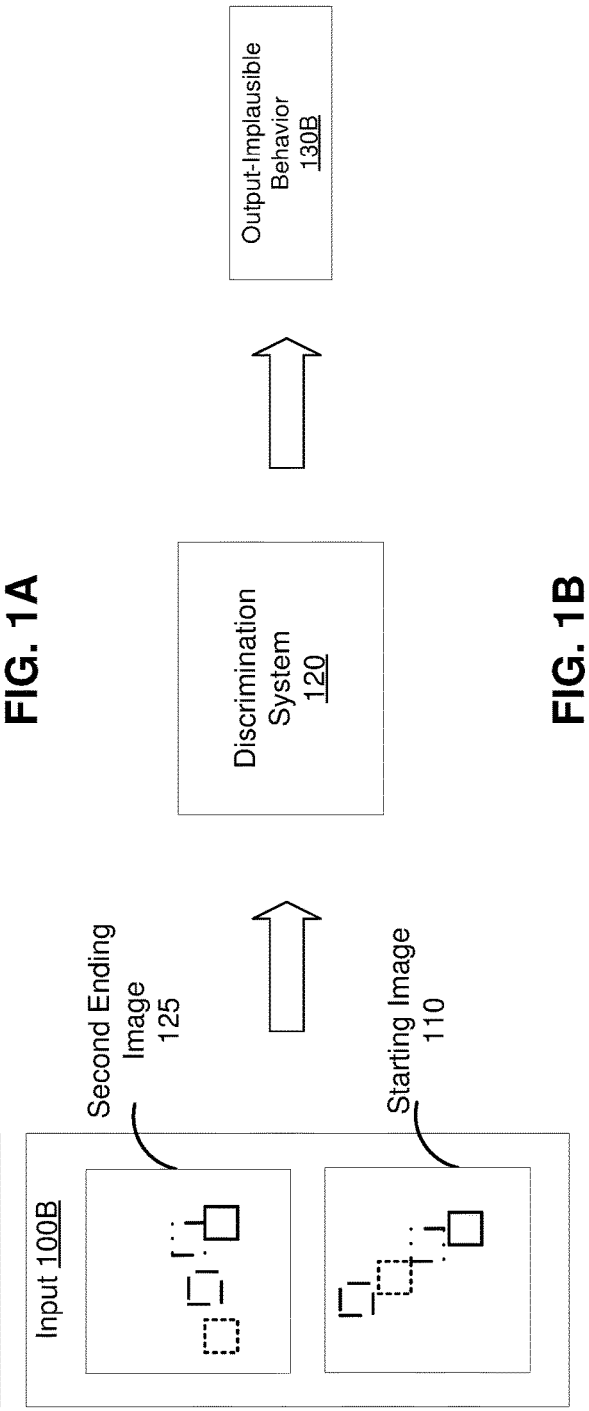
FIG. 1B is another example of discriminating objects' behaviors between the starting and another ending image, via the discrimination system, in accordance with an embodiment.

FIG. 1B is another example of discriminating objects' behaviors between the starting image 110 and a second ending image 125, via the discrimination system 120, in accordance with an embodiment. An input 100B includes the starting image 110 and the second ending image 125. Compared with the first ending image 115, the second ending image 125 shows that the four blocks fall over in a third manner at the ending time point such that a block with dotted lines ends up on the left of a dashed-line block. The discrimination system 120 receives the input 100B, and predicts whether the four stacked blocks falling over in the third manner is plausible in comparison to the first manner at the starting point. The discrimination system 120 generates an output 130B indicating that the four stacked blocks falling over in the third manner at the ending time point is implausible. The discrimination system 120 is further described below in FIG. 2.

System Environment Overview

Figure 2:
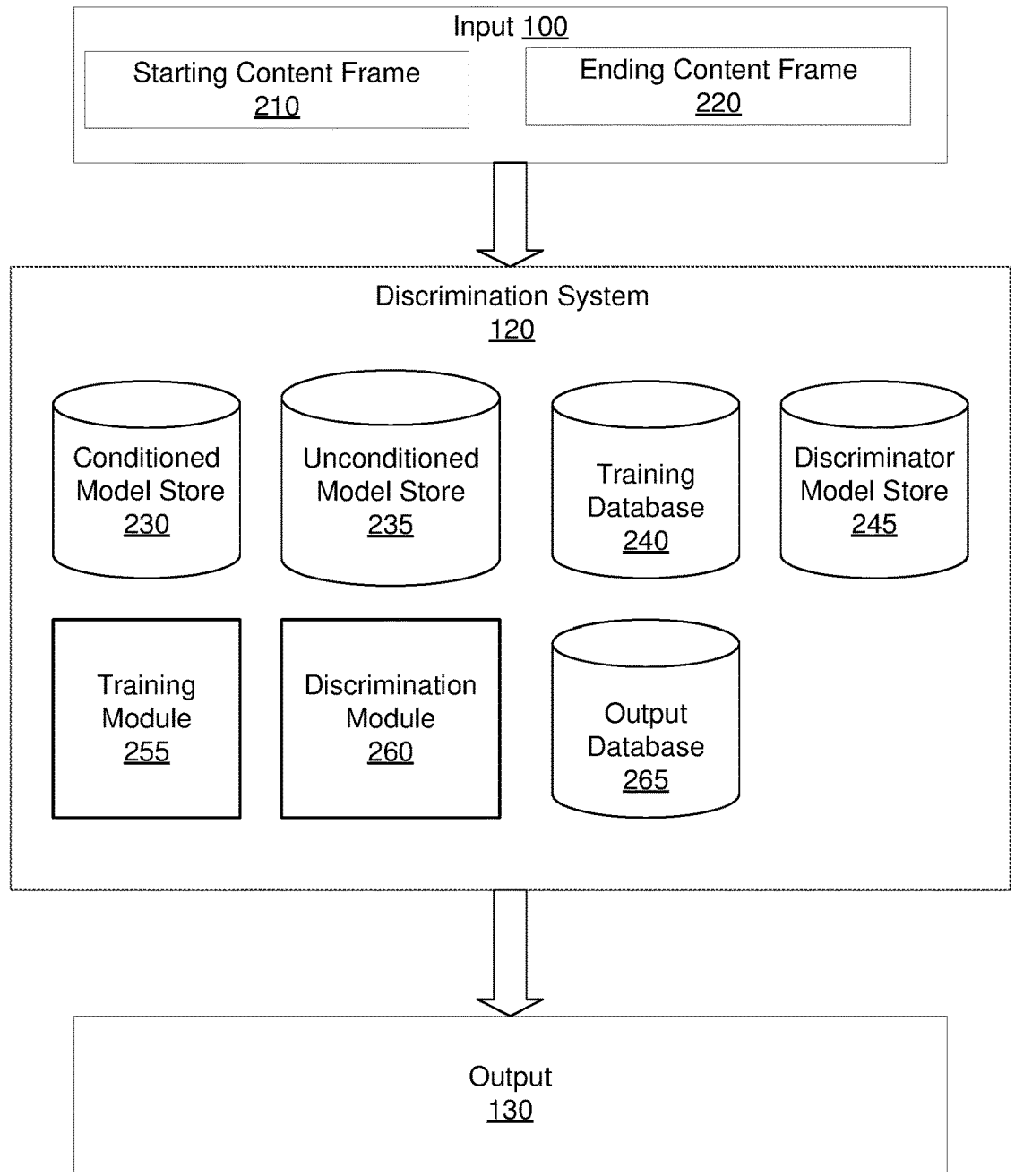
FIG. 2 is a system environment of a discrimination system, in accordance with an embodiment.

FIG. 2 is a system environment 200 of the discrimination system 120, in accordance with an embodiment. The system environment 200 shown by FIG. 2 includes the input 100, the discrimination system 120, and the output 130. In alternative configurations, different and/or additional components may be included in the system environment 200. For example, the system environment 200 includes multiple inputs 100, and each input has a starting image and an ending image. The system environment 200 also includes multiple outputs 130, and each output corresponds to each of the inputs 100.

The input 100 indicates a state of one or more objects at a starting time point and a state of the one or more objects at an ending time point. The state describes an arrangement of the one or more objects at a time point. The input 100 includes a starting content frame 210 and one or more ending content frames 220. Examples of a content frame include an image, a photo, or a series of images (e.g., a video). The starting content frame 210 indicates the state of one or more objects at the starting time point, and the ending content frame 220 indicates the state of the one or more objects at the ending time point. For example, the starting content frame 210 includes the starting image 110, and the ending content frame 220 includes the first ending images 115 and/or the second image 125. In another example, the starting content frame 210 includes a first series of images (e.g., a first video) that include a series of behaviors of one or more objects at a series of starting time points. The ending content frame 210 includes a second series of images (e.g., a second video) that include a series of behaviors of the one or more objects at a series of ending time points. In some embodiments, the starting content frame 210 represents true data distribution (e.g., a true photo). The ending content frame 220 represents generated data (e.g., a synthesized photo) produced by an image generator.

The discrimination system 120 predicts a preferred ending frame conforming to plausible physical events from one or more ending frames 220 given the starting content frame 210. For example, as shown in FIGS. 1A and 1B, the discrimination system 120 receives the input 100A. The discrimination system 120 uses a discriminator model to predict that how likely the four stacked blocks falling over in the second manner is plausible given a starting image 110. Similarly, the discrimination system 120 uses the discriminator model to predict how likely the four stacked blocks falling over in the third manner is implausible in comparison to the first manner in the starting image 110. The discrimination system 120 generates the output 130 based on the prediction. For example, if the prediction indicates the state of the ending content frame is plausible, the discrimination system 120 generates the output 130 indicating that the state of the ending content frame is plausible. If the prediction indicates the state of the ending content frame is implausible, the discrimination system 120 generates the output 130 indicating that the state of the ending content frame is implausible. Additionally, the discrimination system 120 trains the discriminator model using a conditioned model and an unconditioned model. The discrimination system 120 is further described in detail below.

The output 130 is a value indicating whether the state of the ending content frame 220 is plausible or implausible, in comparison to the state of the starting content frame 210. For example, responsive to the starting image 110 and the first ending image 115, the discrimination system 120 predicts that the state of the first ending image 115 is more likely to be plausible, in comparison to the behavior of the starting image 115. The discrimination system 120 generates the output 130A indicating that the state of the first ending image 115 is plausible, in comparison to the state of the starting image 110. In another example, responsive to the starting image 110 and the second ending image 125, the discrimination system 120 predicts that the state of the second ending image 125 is more likely to be implausible, in comparison to the state of the starting image 110. The discrimination system 120 generates the output 130B indicating that the state of the second ending image 125 is implausible, in comparison to the state of the starting image 110. In some embodiments, the output 130 is a scalar value (e.g., "0" or "1"). The output 130 is a first scalar value (e.g., "1") indicating that the ending content frame 220 is plausible. Alternatively, the output 130 is a second scalar value (e.g., "0") indicating that the ending content frame 220 is implausible.

Discrimination System

The discrimination system 120 shown in FIG. 2 includes a conditioned model store 230, an unconditioned model store 235, a training database 240, a discriminator model store 245, a training module 255, a discrimination module 260, and an output database 265. In other embodiments, the discrimination system 120 may include additional, fewer, or different components for various applications. For example, the discrimination system 120 may include an interface. The interface receives the input 100, facilitates communications among components of the discrimination system 120, and transmits the output 130.

The conditioned model store 230 stores one or more conditioned models (also referred to as conditioned image generator) that is trained to use the starting content frame 210 as a condition to generate one or more ending content frames having plausible behaviors (also referred to as plausible ending content), in comparison to the state of the starting content frame 210. In some embodiments, the conditioned model is a conditioned generative adversarial network (GAN) model. The conditioned GAN model receives the starting content frame 210 (e.g., the starting image 110) and/or one or more simulated noises to generate plausible ending content (e.g., the first ending image 115, or other content having a plausible behavior). For example, the starting content 210 is the starting image 110. The conditioned GAN model generates one or more plausible ending images such that the plausible ending images have the same number of blocks as the number of the blocks in the starting image 110, and also have blocks located on right locations, such as the first ending image 115. The generated plausible ending content frames are used as a positive training set for plausible ending content frames and are stored in the training database 240. The conditioned models are trained as further described in FIG. 3A.

The unconditioned model store 235 stores one or more unconditioned models (also referred to as unconditioned image generator). Without using the starting content frame 210 as a condition, the one or more unconditioned models generate subsequent content frames (e.g., "noisy data" unrelated to the state of those objects at the starting point). The discrimination system 120 treats the generated subsequent content frames of the unconditioned models as one or more ending content frames having implausible behaviors (also referred to as implausible ending content frames), in comparison to the behavior of the starting content frame 210. In some embodiments, the unconditioned model is an unconditioned GAN model. The unconditioned GAN model generates the implausible ending content frame. For example, the starting content frame 210 is the starting image 110. The unconditioned GAN model generates one or more implausible ending images such that the implausible ending images have wrong number of blocks compared with the starting image 110, and/or have one or more blocks located on wrong locations, such as the second ending image 125. In some embodiments, the unconditioned GAN model has the same structure as the conditioned GAN model such that the unconditioned GAN model generates the same type of content as the conditioned GAN model. Additionally, the unconditioned GAN model receives one or more noises to generate the implausible ending content frame. The generated implausible ending content frames are used as a negative training set for plausible ending content frames and are stored in the training database 240.

The training database 240 stores the positive training set for plausible ending content frames, the positive training set for plausible ending content frames, and true ending content frames that depict actual states of the objects at the ending time point.

The discriminator model store 245 stores one or more trained and/or untrained discriminator. There are two types of discriminator models. One type is a conditioning discriminator model that discriminates between ending content frames generated by the conditioned model and true ending frames based on a starting frame also provided to the conditioned model. The other type is a plausible discriminator model that discriminates between the ending content frames generated by the conditioned model and the unconditioned model based on a starting content frame also provided to the conditioned model.

The training module 255 trains one or more untrained discriminator models from the discriminator model store 245 using training data from the training database 240 and the starting content frame 210. The training module 255 uses the starting content frame 210, plausible ending content frames from trained conditioned model as the positive training set to train a plausible discriminator model to predict that how likely an ending content frame is plausible. Additionally, the training module 255 uses the starting content frame 210, and implausible ending content frames from trained unconditioned model as the negative training set to train the plausible discriminator model to predict that how likely an ending content frame is implausible.

The training module 255 jointly trains the conditioned model with the conditioning discriminator model. The training module 255 uses the starting content frame 210 and subsequent content frames from the conditioning discriminator model to train the conditioned model to generate plausible ending content frames. For example, the conditioned model generates a first subsequent content frame using the starting content frame 210. If the conditioning discriminator model predicts that the first subsequent content frame is more likely to be implausible, the training module 255 trains the conditioned model to generate a second subsequent content frame, and the second subsequent content frame is predicted by the conditioning discriminator model. This process may be repeated until the conditioning discriminator model predicts that a subsequent content frame of the conditioned model is more likely to be plausible. That subsequent content frame is treated as a positive training set for plausible ending content frames for training the plausible discriminator model. Additionally, the training module 255 uses the starting content frame 210, a subsequent content frame generated from the conditioned model and the true ending content frame to train the conditioning discriminator model to discriminate between content frames generated by the conditioned model and true ending frames based on a starting frame also provided to the conditioned model. An example of jointly training the conditioned model with the conditioning discriminator model is further described in FIG. 3A.

The training module 255 also jointly trains the plausible discriminator model with the unconditioned model. The training module 255 uses the starting content frame 210, plausible ending content frames from the trained conditioned model, and subsequent content frames from the unconditioned model to train the plausible discriminator model to discriminate between the frames generated by the conditioned model and the unconditioned model based on the starting content frame 210 also provided to the conditioned model, and the unconditioned model is trained without the starting content frame 210. The training module 255 uses the starting content frame 210 and outputs of the plausible discriminator model to train the unconditioned model. The trained unconditioned model generates negative training set for plausible ending content frames or training the plausible discriminator model. An example of jointly training the plausible discriminator model with the unconditioned model is further described in FIG. 3B.

The discrimination module 260 predicts a preferred ending frame conforming to plausible physical events from one or more ending content frames given a starting content frame. For example, the discrimination module 260 receives the input 100. The discrimination module 260 applies a trained plausible discriminator model from the discriminator model store 245 to predict how likely the state of the ending content frame 220 is plausible or implausible given the state of the starting content 210. The discrimination module 260 generates the output 130 indicating whether the state of the ending content frame 220 is plausible or implausible. The output 130 is stored in the output database 265. Examples are described above in FIGS. 1A and 1B.

Discriminator Model Training

Figure 3A:
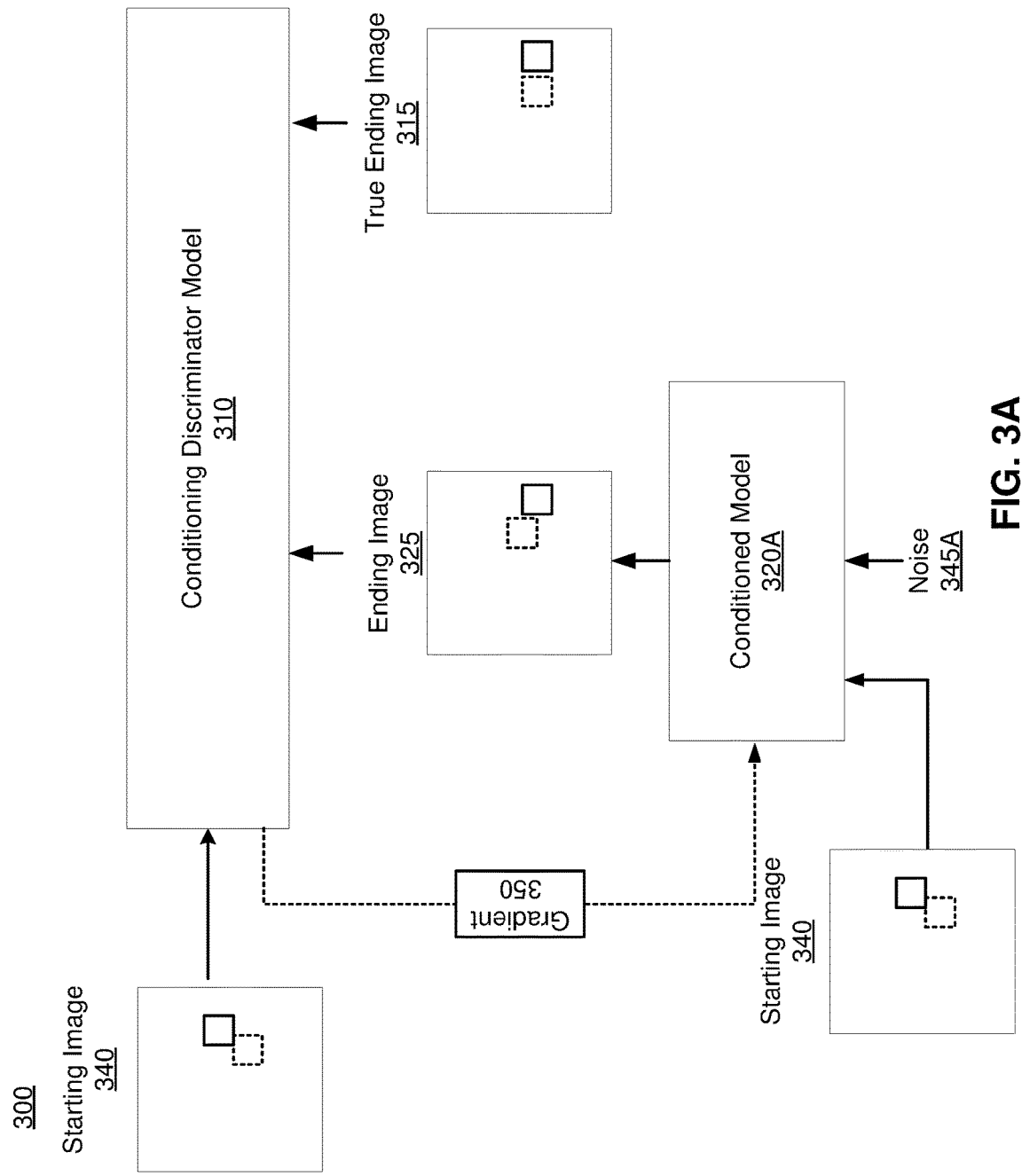
FIG. 3A is an example of jointly training a conditioning discriminator model with a conditioned model based in part on a true ending content frame, in accordance with an embodiment.

FIG. 3A is an example of jointly training a conditioning discriminator model 310A with a conditioned model 320A based in part on a true ending content frame 315, in accordance with an embodiment. In the embodiment of FIG. 3, the conditioned model 320A (e.g., a conditioned GAN model) receives a starting image 340 including two stacked blocks (e.g., one is marked by dotted lines at the bottom, and the other is marked by solid lines on the top) and receives a noise 345A to generate an ending image 325. The starting image 340, the ending image 325, and the true ending image 315 train the conditioning discriminator model 310 to predict how likely the ending image 325 is plausible and to generate an output 350. The output 350 and the starting image 340 train the conditioned model 320A to update the ending image 325. The updated ending image (not shown) and the starting image 340 train the conditioning discriminator model 310 again to discriminate between the ending image 325 and the true ending image 315 given the starting image 340. The conditioning discriminator model 310 updates the output 350. The updated output (not shown) indicates that the second ending image (not shown) is more likely to be plausible than the ending image 325. This process may be repeated until an output indicates that the generated ending image is plausible. As such, the conditioned model 320A is trained to generate plausible ending images as a positive training set for plausible content frames to train a plausible discriminator model 313.

Figure 3B:
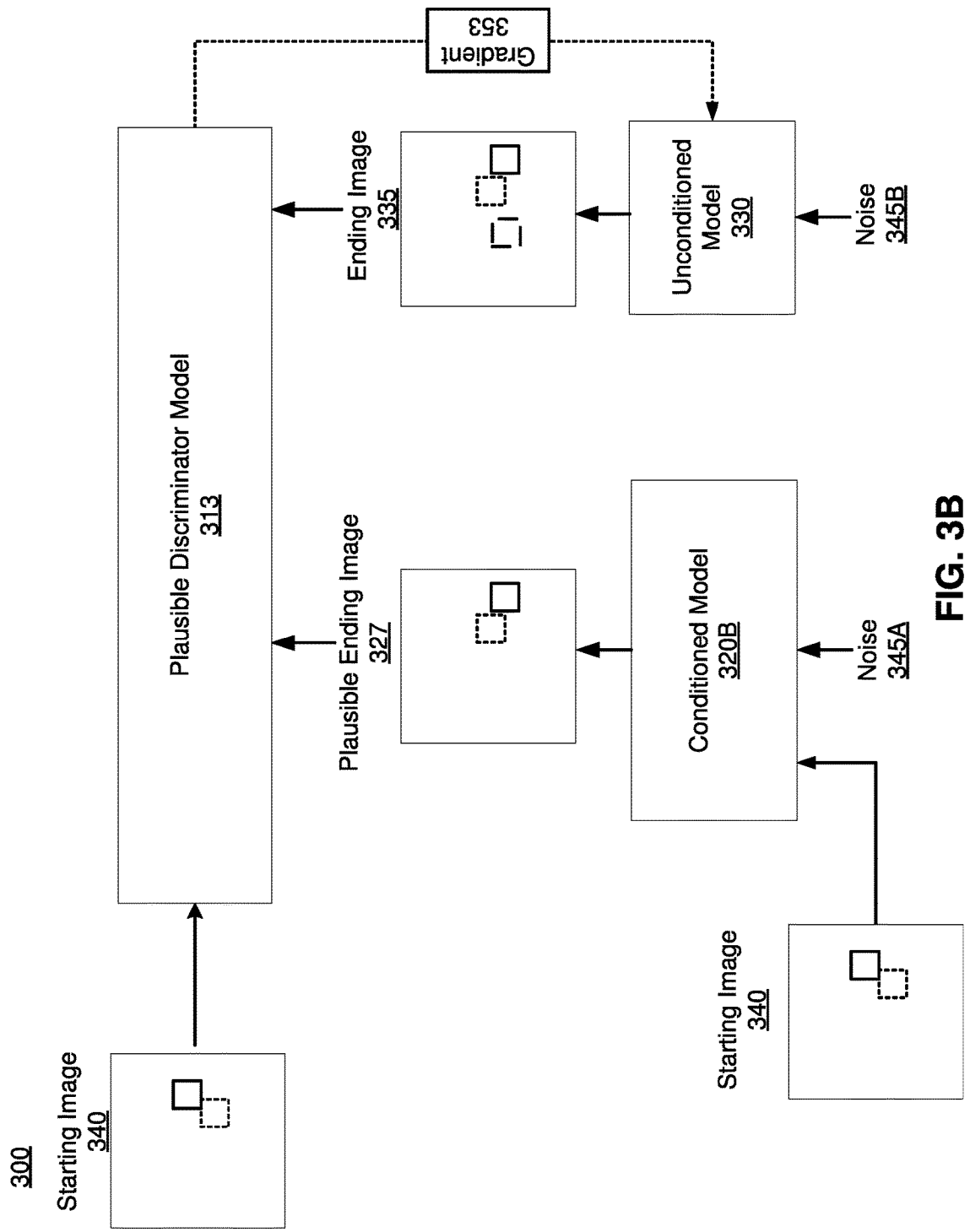
FIG. 3B is an example of jointly training a plausible discriminator model with an unconditioned model based in part on a plausible ending image from the first model in FIG. 3A, in accordance with an embodiment.

FIG. 3B is an example of jointly training the plausible discriminator model 313 with an unconditioned model 330 based in part on a plausible ending image 327 from the trained conditioned model 320B in FIG. 3A, in accordance with an embodiment. In the embodiment of FIG. 3, the unconditioned model 330 (e.g., an unconditioned GAN model) only receives a noise 345B to generate an ending image 335 having three blocks. In some embodiments, the noises 345A and 345B are different. The ending image 335 and the starting image 340 train the plausible discriminator model 313 to discriminate the plausible ending image 327 and the ending image 335 given the staring image 340. The plausible discriminator model 313 generates an output 353. The output 353 trains the unconditioned model 330 to generate a better implausible ending image. The trained unconditioned model 330 generates an implausible ending image as a negative training set for plausible ending content frames to training the plausible discriminator model 313.

FIG. 4 is a flowchart illustrating a process 400 for training a discriminator model, in accordance with an embodiment. The process 400 is performed by the discrimination system 120. The process 400 may include different or additional steps than those described in conjunction with FIG. 4 in some embodiments or perform steps in different orders than the order described in conjunction with FIG. 4.

The discrimination system 120 receives 410 a set of starting content frames. Each starting content frame depicts a state of a plurality of objects at a starting time point. Examples of a content frame include an image, a photo, or a series of images (e.g., a video), as described above with respect to the input 100 of FIG. 2.

The discrimination system 120 applies 420 a first model (e.g., a conditioned model) to generate a set of plausible ending content frames for each starting content frame. The first model is trained to generate a subsequent content frame based on a starting content frame, as described above with respect to the conditioned model store 230 of FIG. 2.

The discrimination system 120 applies 430 a second model (e.g., an unconditioned model) to generate a set of implausible ending content frames for each starting content frame. The second model is trained to generate a subsequent content frame without using a starting content frame, as described above with respect to the unconditioned model store 235 of FIG. 2. Steps 410 to 430 can be repeated 405 for different starting content to obtain a sufficiently large training set.

The discrimination system 120 trains 440 a discriminator model (e.g., a plausible discriminator model) using the set of starting content frames, the set of plausible ending content frames, and the set of implausible ending content, to predict a preferred ending frame conforming to plausible physical events from a first and second ending frame given a starting content frame. The set of plausible ending content frames are a positive training set for plausible ending frames and the set of implausible ending frames are a negative training set for the set of plausible ending content frames. The discriminator model is jointly trained as an adversarial network with the second model. The discriminator model is trained to discriminate between the content frames generated by the first model and the second model based on a starting content frame also provided to the first model, and the second model is trained without the starting content frame. The first model is jointly trained as an adversarial network with another discriminator model, the other discriminator model trained to discriminate between frames generated by the first model and true ending frames based on a starting frame also provided to the first model. Examples are described above in FIG. 2 through FIG. 3B.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a set of starting content frames, each depicting a state of a plurality of objects at a starting time point;
   applying a first model to generate a set of plausible ending content frames for each starting content frame, the first model trained to generate a subsequent content frame based on a starting content frame, each of the set of plausible ending content frames representing a plausible behavior of the plurality of objects based on physical phenomena;
   applying a second model to generate a set of implausible ending content frames for each starting content frame, the second model trained to generate a subsequent content frame without using a starting content frame, each of the set of implausible ending content frames representing an implausible behavior of the plurality of objects based on physical phenomena; and
   training a discriminator model using the set of starting content frames, the set of plausible ending content frames, and the set of implausible ending content, to predict a preferred ending frame conforming to plausible physical events from a first and second ending frame given a starting content frame, wherein the set of plausible ending content frames are a positive training set for plausible ending frames and the set of implausible ending frames are a negative training set for the set of plausible ending content frames.

2. The method of claim 1, wherein the discriminator model is jointly trained as an adversarial network with the second model, the discriminator model trained to discriminate between the frames generated by the first model and the second model based on a starting content frame also provided to the first model, and the second model trained without the starting content frame.

3. The method of claim 1, wherein the first model is jointly trained as an adversarial network with another discriminator model, the other discriminator model trained to discriminate between frames generated by the first model and true ending frames based on a starting frame also provided to the first model.

4. The method of claim 1, wherein the second model comprises the same structure as the first model such that the second model generates the same type of content as the first model.

5. The method of claim 4, wherein the first model comprises a first generative adversarial network (GAN) model, and the second model comprises a second GAN model.

6. The method of claim 1, further comprising:
   receiving an ending content frame indicating a state of a plurality of objects at an ending point; and
   predicting how likely the ending content frame is based on the discriminator model.

7. The method of claim 6, further comprising generating a scalar value based on the predicting likelihood.

8. A non-transitory computer-readable medium comprising computer program instructions that when executed by a computer processor of a discrimination system causes the processor to perform steps comprising:
   receiving a set of starting content frames depicting a plurality of objects at a starting time point and behavior of the plurality of objects at the starting time point;
   applying a first model to generate a set of plausible ending content frames for each starting content frame, the first model trained to generate a subsequent content frame based on a starting content frame, each of the set of plausible ending content frames representing a plausible behavior of the plurality of objects based on physical phenomena;
   applying a second model to generate a set of implausible ending content frames for each starting content frame, the second model trained to generate a subsequent content frame without using a starting content frame, each of the set of implausible ending content frames representing an implausible behavior of the plurality of objects based on physical phenomena; and
   training a discriminator model using the set of starting content frames, the set of plausible ending content frames, and the set of implausible ending content, to predict a preferred ending frame conforming to plausible physical events from a first and second ending frame given a starting content frame, wherein the set of plausible ending content frames are a positive training set for plausible ending frames and the set of implausible ending frames are a negative training set for the set of plausible ending content frames.

9. The non-transitory computer-readable medium of claim 8, wherein the discriminator model is jointly trained as an adversarial network with the second model, the discriminator model trained to discriminate between the frames generated by the first model and the second model based on a starting content frame also provided to the first model, and the second model trained without the starting content frame.

10. The non-transitory computer-readable medium of claim 8, wherein the first model is jointly trained as an adversarial network with another discriminator model, the other discriminator model trained to discriminate between frames generated by the first model and true ending frames based on a starting frame also provided to the first model.

11. The non-transitory computer-readable medium of claim 8, wherein the second model comprises the same structure as the first model such that the second model generates the same type of content as the first model.

12. The non-transitory computer-readable medium of claim 11, wherein the first model comprises a first generative adversarial network (GAN) model, and the second model comprises a second GAN model.

13. The non-transitory computer-readable medium of claim 8, further comprising:
receiving an ending content frame indicating a state of a plurality of objects at an ending point; and
predicting how likely the ending content frame is based on the discriminator model.

14. The non-transitory computer-readable medium of claim 13, further comprising generating a scalar value based on the predicting.

15. A system comprising:
a processor; and
a non-transitory computer-readable medium comprising computer program instructions that when executed by the processor causes the processor to perform steps comprising:
receiving a set of starting content frames depicting a plurality of objects at a starting time point and behavior of the plurality of objects at the starting time point;
applying a first model to generate a set of plausible ending content frames for each starting content frame, the first model trained to generate a subsequent content frame based on a starting content frame, each of the set of plausible ending content frames representing a plausible behavior of the plurality of objects based on physical phenomena;
applying a second model to generate a set of implausible ending content frames for each starting content frame, the second model trained to generate a subsequent content frame without using a starting content frame, each of the set of implausible ending content frames representing an implausible behavior of the plurality of objects based on physical phenomena; and
training a discriminator model using the set of starting content frames, the set of plausible ending content frames, and the set of implausible ending content, to predict a preferred ending frame conforming to plausible physical events from a first and second ending frame given a starting content frame, wherein the set of plausible ending content frames are a positive training set for plausible ending frames and the set of implausible ending frames are a negative training set for the set of plausible ending content frames.

16. The system of claim 15, wherein the discriminator model is jointly trained as an adversarial network with the second model, the discriminator model trained to discriminate between the frames generated by the first model and the second model based on a starting content frame also provided to the first model, and the second model trained without the starting content frame.

17. The system of claim 15, wherein the first model is jointly trained as an adversarial network with another discriminator model, the other discriminator model trained to discriminate between frames generated by the first model and true ending frames based on a starting frame also provided to the first model.

18. The system of claim 15, wherein the second model comprises the same structure as the first model such that the second model generates the same type of content as the first model.

19. The system of claim 18, wherein the first model comprises a first generative adversarial network (GAN) model, and the second model comprises a second GAN model.

20. The system of claim 15, wherein the computer program instructions that when executed by the processor causes the processor to perform steps further comprising:
receiving an ending content frame indicating a state of a plurality of objects at an ending point; and
predicting how likely the ending content frame is based on the discriminator model.

* * * * *